(12) United States Patent
Basu et al.

(10) Patent No.: US 10,051,060 B2
(45) Date of Patent: Aug. 14, 2018

(54) SENSOR DATA SEGMENTATION AND VIRTUALIZATION

(71) Applicant: International Business Machines Corporation, Armonk, NY (US)

(72) Inventors: Joydeep Basu, East Kolkata Township (IN); Yuk L. Chan, Rochester, NY (US); Badalkumar L. Choudhary, Fremont, CA (US); Karunakaran Karuppiah, San Jose, CA (US); Heidi L. Lagares-Greenblatt, Highland, NY (US); Rakesh Ranjan, San Jose, CA (US); Nicholas A. Vargas, Hollister, CA (US); Vatatmaja, Overland Park, KS (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/959,755

(22) Filed: Dec. 4, 2015

(65) Prior Publication Data

US 2017/0163734 A1 Jun. 8, 2017

(51) Int. Cl.
*G06F 15/173* (2006.01)
*G06F 15/16* (2006.01)
*H04L 29/08* (2006.01)
*H04L 12/26* (2006.01)
*H04L 12/24* (2006.01)

(52) U.S. Cl.
CPC .......... *H04L 67/12* (2013.01); *H04L 41/0654* (2013.01); *H04L 43/0817* (2013.01); *H04L 43/10* (2013.01)

(58) Field of Classification Search
CPC .. H04L 43/0817; H04L 43/10; H04L 41/0654
USPC ........................................................ 709/224
See application file for complete search history.

(56) References Cited

U.S. PATENT DOCUMENTS

| | | | |
|---|---|---|---|
| 6,772,099 B2 * | 8/2004 | Merkin | G06F 11/3006 700/52 |
| 6,904,391 B2 | 6/2005 | Merkin et al. | |
| 7,787,969 B2 | 8/2010 | Grichnik et al. | |
| 7,830,805 B2 | 11/2010 | Cohen et al. | |
| 9,080,438 B1 * | 7/2015 | McCoy | E21B 47/18 |

(Continued)

FOREIGN PATENT DOCUMENTS

EP 2523112 A1 11/2012

OTHER PUBLICATIONS

"MQTT v3.1.1 now an OASIS Standard," [online] MQTT.org, News, Nov. 7, 2014 [retrieved Nov. 2, 2015] retrieved rom the Internet: <http://mqtt.org/> 2 pg.

(Continued)

*Primary Examiner* — Karen Tang
(74) *Attorney, Agent, or Firm* — Cuenot, Forsythe & Kim, LLC

(57) ABSTRACT

A utilization by at least one virtual sensor of sensor data provided by at least one sensor can be monitored. A utilization of virtual sensor data by at least one application can be monitored. The virtual sensor data can generated by the at least one virtual sensor based on the sensor data. At least a first sensor data use parameter indicating the utilization of the virtual sensor data by the at least one application can be generated.

20 Claims, 9 Drawing Sheets

(56) References Cited

U.S. PATENT DOCUMENTS

| | | | |
|---|---|---|---|
| 2003/0088524 A1* | 5/2003 | Bibelhausen | G06Q 30/02 705/400 |
| 2003/0229900 A1* | 12/2003 | Reisman | G06F 17/30873 725/87 |
| 2005/0154598 A1* | 7/2005 | Kanayama | G06Q 20/102 705/400 |
| 2005/0228627 A1 | 10/2005 | Bellantoni et al. | |
| 2007/0002576 A1* | 1/2007 | Lee | G02B 6/0053 362/500 |
| 2007/0087756 A1* | 4/2007 | Hoffberg | G06Q 10/0631 455/450 |
| 2008/0175356 A1* | 7/2008 | Seidberg | G08B 25/08 379/45 |
| 2008/0253284 A1* | 10/2008 | Montalvo | H04L 47/10 370/230 |
| 2008/0298248 A1* | 12/2008 | Roeck | H04L 47/10 370/237 |
| 2008/0316938 A1* | 12/2008 | Shi | H04L 12/5695 370/252 |
| 2009/0019486 A1* | 1/2009 | Kalaboukis | H04N 21/2547 725/41 |
| 2009/0076887 A1* | 3/2009 | Spivack | G06Q 30/02 705/14.69 |
| 2010/0015926 A1* | 1/2010 | Luff | H04L 41/0604 455/67.13 |
| 2010/0332304 A1* | 12/2010 | Higgins | G06Q 30/02 705/14.16 |
| 2011/0276951 A1 | 11/2011 | Jain | |
| 2011/0295999 A1* | 12/2011 | Ferris | G06F 9/5072 709/224 |
| 2012/0011036 A1* | 1/2012 | Burton | G06Q 30/04 705/34 |
| 2012/0020218 A1* | 1/2012 | Li | H04L 43/067 370/235 |
| 2012/0022700 A1 | 1/2012 | Drees et al. | |
| 2012/0106391 A1* | 5/2012 | van Loon | H04L 12/1886 370/252 |
| 2012/0137003 A1* | 5/2012 | Ferris | H04W 4/003 709/226 |
| 2012/0226808 A1* | 9/2012 | Morgan | G06F 9/5072 709/226 |
| 2012/0284713 A1 | 11/2012 | Ostermeyer et al. | |
| 2013/0054688 A1* | 2/2013 | Rourke | G06F 17/3089 709/204 |
| 2013/0073261 A1 | 3/2013 | Kim et al. | |
| 2013/0110675 A1* | 5/2013 | Bouw | G06Q 30/04 705/26.41 |
| 2013/0223222 A1* | 8/2013 | Kotecha | H04L 43/0882 370/235 |
| 2013/0227569 A1* | 8/2013 | Kohli | G06F 9/455 718/1 |
| 2013/0275059 A1 | 10/2013 | Bernhard et al. | |
| 2014/0024336 A1* | 1/2014 | Tavares | H04L 12/1489 455/406 |
| 2014/0025337 A1* | 1/2014 | Blount | G05B 23/0221 702/183 |
| 2014/0025338 A1* | 1/2014 | Blount | G05B 23/0221 702/183 |
| 2014/0075043 A1* | 3/2014 | Gerecke | H04L 29/0602 709/231 |
| 2014/0101332 A1* | 4/2014 | Lipman | H04L 47/25 709/235 |
| 2014/0156467 A1* | 6/2014 | Typaldos | G06Q 30/0635 705/26.81 |
| 2014/0214726 A1* | 7/2014 | Minato | G06Q 30/0283 705/400 |
| 2014/0218355 A1* | 8/2014 | Wilkins | G06T 3/005 345/419 |
| 2015/0006258 A1* | 1/2015 | Salama | G06Q 30/0206 705/7.35 |
| 2015/0109128 A1* | 4/2015 | Fadell | G08B 27/003 340/540 |
| 2015/0127565 A1* | 5/2015 | Chevalier | G06Q 10/00 705/319 |
| 2015/0156031 A1* | 6/2015 | Fadell | H04L 12/2816 700/276 |
| 2015/0207809 A1* | 7/2015 | Macaulay | G06F 21/552 726/22 |
| 2015/0227890 A1* | 8/2015 | Bednarek | G06Q 10/08355 705/26.81 |
| 2015/0294431 A1* | 10/2015 | Fiorucci | G06Q 50/26 705/13 |
| 2015/0373482 A1* | 12/2015 | Barnard | H04L 1/08 370/338 |
| 2015/0373493 A1* | 12/2015 | Chowdhury | H04L 51/38 455/456.3 |
| 2016/0037438 A1* | 2/2016 | Manroa | H04W 12/06 370/338 |
| 2016/0072877 A1 | 3/2016 | Hirschfeld et al. | |
| 2016/0072891 A1* | 3/2016 | Joshi | G05D 23/1393 370/254 |
| 2016/0105644 A1* | 4/2016 | Smith | H04N 5/23206 348/159 |
| 2016/0119262 A1* | 4/2016 | Siegel | H04L 51/06 709/206 |
| 2016/0217662 A1* | 7/2016 | Kashar | G04G 21/04 |
| 2017/0078922 A1 | 3/2017 | Raleigh et al. | |
| 2017/0160110 A1 | 6/2017 | Basu et al. | |

OTHER PUBLICATIONS

"Virtual Sensors," [online] IntelliDynamics © 2015 [retrieved Sep. 22, 2015], retrieved from the Internet: <http://www.intellidynamics.net/content/technologies/virtual-sensors.html>, 4 pg.

Steele, J., "Understanding Virtual Sensors: From Sensor Fusion to Context-Aware Applications," [online] Electronic Design.com, Jul. 10, 2012 [retrieved Dec. 4, 2015], retrieved from the Internet: <http://electronicdesign.com/ios/understanding-virtual-sensors-sensor-fusion-context-aware-applications>, 4 pg.

IBM Appendix, List of IBM Patents or Patent Applications Treated as Related, 2 pg.

\* cited by examiner

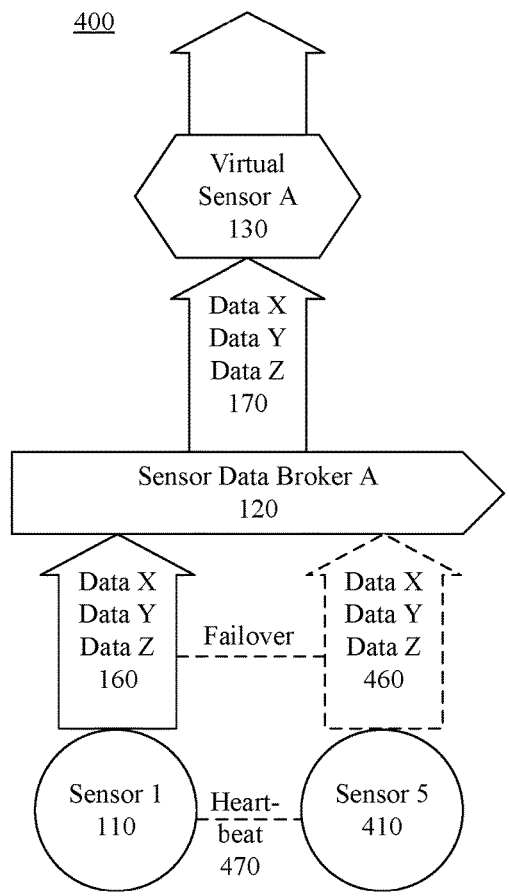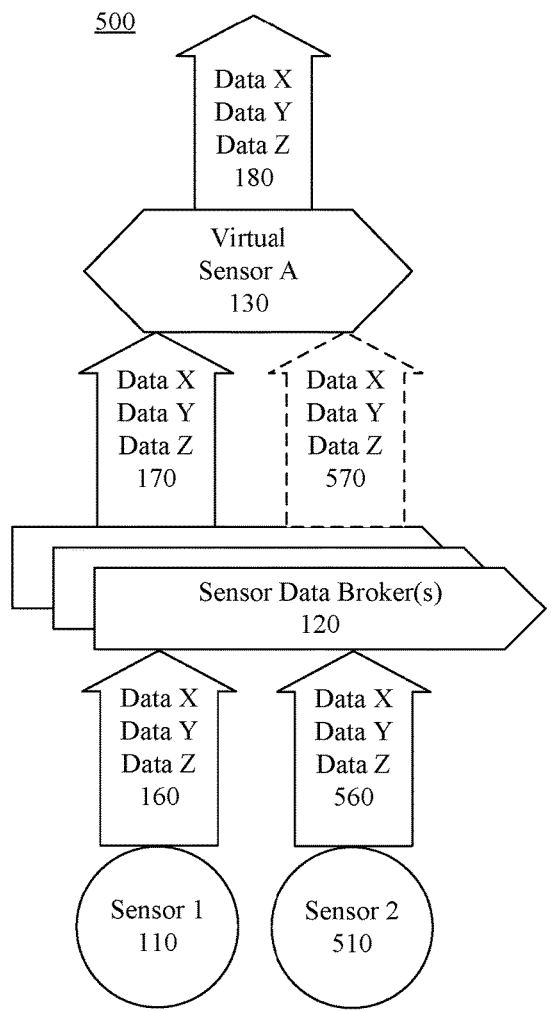
FIG. 4
FIG. 5

700

Receive, by a sensor data broker executed by a processor, first sensor data generated by a first of a plurality of sensors and at least second sensor data generated by at least a second of the plurality of sensors
705

Publish, by the sensor data broker, to at least a first virtual sensor the first sensor data as first published sensor data
710

Publish, by the sensor data broker, to at least a second virtual sensor the second sensor data as second published sensor data
715

```
┌─────────────────────────────────────────────────────────────────────┐
│ Monitor a utilization by at least one virtual sensor of sensor data │
│ provided by at least one sensor                                     │
│ 805                                                                 │
└─────────────────────────────────────────────────────────────────────┘
                                    ↓
┌─────────────────────────────────────────────────────────────────────┐
│ Monitor a utilization by at least one application of virtual sensor │
│ data published by the at least one virtual sensor, wherein the      │
│ virtual sensor data is generated by the at least one virtual sensor │
│ based on the sensor data                                            │
│ 810                                                                 │
└─────────────────────────────────────────────────────────────────────┘
                                    ↓
┌─────────────────────────────────────────────────────────────────────┐
│ Generate, using a processor, at least a first sensor data use       │
│ parameter indicating the utilization of the virtual sensor data by  │
│ the at least one application                                        │
│ 815                                                                 │
└─────────────────────────────────────────────────────────────────────┘
                                    ↓
┌─────────────────────────────────────────────────────────────────────┐
│ Generate at least a second sensor data use parameter indicating the │
│ utilization of the sensor data by the at least one virtual sensor   │
│ 820                                                                 │
└─────────────────────────────────────────────────────────────────────┘
                                    ↓
┌─────────────────────────────────────────────────────────────────────┐
│ Determine a fee to be charged for use of the virtual sensor data by │
│ the at least one application based on the first sensor data use     │
│ parameter indicating the utilization of the virtual sensor data by  │
│ the at least one application                                        │
│ 825                                                                 │
└─────────────────────────────────────────────────────────────────────┘
                                    ↓
┌─────────────────────────────────────────────────────────────────────┐
│ Determine a fee to be charged for use of the sensor data by the at  │
│ least one virtual sensor based on the second sensor data use        │
│ parameter indicating the utilization of the sensor data by the at   │
│ least one virtual sensor                                            │
│ 830                                                                 │
└─────────────────────────────────────────────────────────────────────┘
                                    ↓
                                   (A)
```

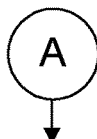

Determine a compensation to be provided to an entity managing or controlling the at least one virtual sensor based on the first sensor data use parameter indicating the utilization of the virtual sensor data by the at least one application
835

Determine a compensation to be provided to an entity managing or controlling the at least one sensor based on the first sensor data use parameter indicating the utilization of the virtual sensor data by the at least one application and/or the second sensor data use parameter indicating the utilization of the sensor data by the at least one virtual sensor
840

Determine a compensation to be provided to an entity managing or controlling a sensor data communication system based on the first sensor data use parameter indicating the utilization of the virtual sensor data by the at least one application and/or the second sensor data use parameter indicating the utilization of the sensor data by the at least one virtual sensor
845

FIG. 8b

SENSOR DATA SEGMENTATION AND VIRTUALIZATION

BACKGROUND

The present invention relates to sensor data, and more specifically, to managing communication of sensor data.

The Internet of Things (IoT) is the network of physical objects or "things" embedded with electronics, software, sensors, and network connectivity, which enables these objects to collect and exchange data. The Internet of Things allows objects to be sensed and controlled remotely across existing network infrastructure, creating opportunities for more direct integration between the physical world and computer-based systems. This results in improved efficiency and accuracy in data management, and provides corresponding economic benefits. Each thing is uniquely identifiable through its embedded computing system and is able to interoperate within the existing Internet infrastructure. Experts estimate that the IoT will consist of almost 50 billion objects by the year 2020.

SUMMARY

A method includes monitoring a utilization of sensor data, provided by at least one sensor, by at least one virtual sensor. The method also can include monitoring a utilization by at least one application of virtual sensor data, wherein the virtual sensor data is generated by the at least one virtual sensor based on the sensor data. The method also can include generating, using a processor, at least a first sensor data use parameter indicating the utilization of the virtual sensor data by the at least one application.

A system includes a processor programmed to initiate executable operations. The executable operations include monitoring a utilization of sensor data, provided by at least one sensor, by at least one virtual sensor. The executable operations also can include monitoring a utilization by at least one application of virtual sensor data, wherein the virtual sensor data is generated by the at least one virtual sensor based on the sensor data. The executable operations also can include generating, using a processor, at least a first sensor data use parameter indicating the utilization of the virtual sensor data by the at least one application.

A computer program includes a computer readable storage medium having program code stored thereon. The program code is executable by a processor to perform a method. The method includes monitoring, by the processor, a utilization of sensor data, provided by at least one sensor, by at least one virtual sensor. The method also can include monitoring, by the processor, a utilization by at least one application of virtual sensor data, wherein the virtual sensor data is generated by the at least one virtual sensor based on the sensor data. The method also can include generating, by the processor, at least a first sensor data use parameter indicating the utilization of the virtual sensor data by the at least one application.

BRIEF DESCRIPTION OF THE DRAWINGS

FIGS. 1-6 are block diagrams illustrating various examples of a sensor data communication system.

FIG. 7 is a flow chart illustrating an example of a method of brokering sensor data.

FIGS. 8a and 8b are a flow chart illustrating another example of a method of brokering sensor data.

DETAILED DESCRIPTION

Figure 1:
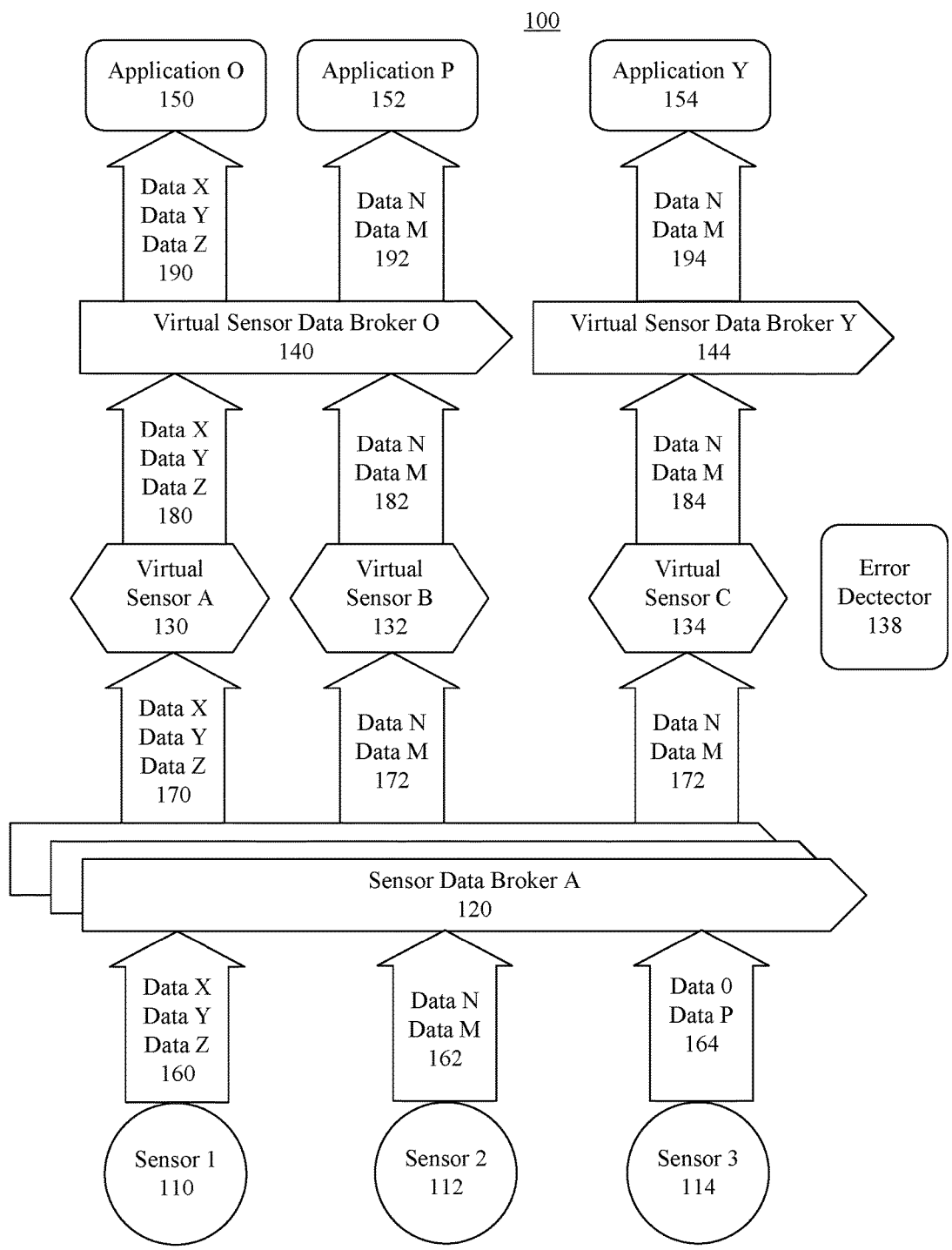

The present invention relates to sensor data, and more specifically, to providing sensor data as a service using a virtual sensor infrastructure that publishes various types of sensor data to applications which subscribe to the sensor data. The infrastructure can include a plurality of virtual sensors that subscribe to sensor data generated by sensors, and publish the sensor data for consumption by one or more applications. In illustration, each virtual sensor can subscribe to a sensor data broker, which can broker sensor data received from one or more sensors. Thus, each virtual sensor can represent sensor data generated by one or more sensors. Each virtual sensor can publish the sensor data to a virtual sensor data broker. Applications can, via the virtual sensor data broker, subscribe to virtual sensors, and thus the sensor data they publish.

Publishing and subscribing is a messaging pattern where senders of messages, called publishers, do not program the messages to be sent directly to specific receivers, called subscribers, but instead characterize published messages into classes without regard to which subscribers will receive the messages. Similarly, subscribers express interest in one or more classes and only received messages that are if interest. Subscribers need not send requests each time messages are desired. Instead, messages are sent by publishers to subscribers in accordance with a subscription scheme, for example as defined in a sensor data service agreement. In the arrangements described herein, the messages contain sensor data. Thus, various components can publish sensor data and various components can subscribe to the sensor data.

The arrangements described herein provide a high level of flexibility in sharing and consuming sensor data. For example, if an application requires sensor data generated by a plurality of different sensors, the application can subscribe to a virtual sensor that provides all such sensor data as though the sensor data is generated by a single sensor. Moreover, failover protection can be provided. For example, if a first sensor becomes faulty or inoperative, a virtual sensor data broker can publish sensor data from a second sensor in place of the sensor data which otherwise would be obtained from the first sensor. In another aspect, sensor data for the faulty or inoperative sensor can be approximated and the approximated sensor data can be published as sensor data for that sensor. Still, there are numerous other aspects of the present arrangements, which will described.

Several definitions that apply throughout this document now will be presented.

As defined herein, the term "sensor" means a device and/or software that senses absolute value or a change in a quantity and generates a corresponding signal or data. A sensor can be, for example, a physical sensor, a software sensor, or a combination of a physical sensor and a software sensor.

As defined herein, the term "physical sensor" means a physical device that senses the absolute value or a change in a physical quantity and generates a corresponding signal or data. Examples of a physical quantity include, but are not limited to, temperature, pressure, humidity, level precipitation, flow rate, pH, coefficient of friction, intensity of light, intensity of sound, intensity of radio waves, and the like.

As defined herein, the term "software sensor" means software that senses the absolute value or a change in software based system and generates a corresponding signal or data. A software sensor can, for example, detect processor utilization, memory utilization or the like. As the term "software sensor" is defined herein, a "software sensor" is not a virtual sensor.

As defined herein, the term "virtual sensor" means a data structure that receives sensor data generated by one or more sensors (e.g., physical sensors and/or software sensors), converts or combines the sensor data, and provides a corresponding output.

As defined herein, the term "sensor data broker" means a data structure that receives sensor data from one or more sensors and publishes the sensor data for subscription by one or more virtual sensors.

As defined herein, the term "virtual sensor data broker" means a data structure that receives sensor data from one or more virtual sensors and publishes the sensor data for subscription by one or more applications.

As defined herein, the term "publish" means to make available for subscription. For example, sensor data that is published can be made communicated to applications subscribing to that sensor data.

As defined herein, the term "close approximation" means to be within a particular tolerance. For example, first sensor data that is a close approximation to second sensor data can be data that is within one percent, five percent, ten percent, twenty percent, or the like, of the second sensor data, or meet some pre-defined data correlation.

As defined herein, the term "frequency" means a number of times something occurs within a given time interval. For example, a frequency of communicating sensor data can be two times per second (e.g., at 500 millisecond intervals).

As defined herein, the term "normalize" means to adjust a value measured on one scale to another scale, or to adjust a value measured on one system to be configured to be properly interpreted by another system.

As defined herein, the term "interpolate" means to construct new data points within a range of a discrete set of known data points.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

FIG. 1 is a block diagram illustrating an example of a sensor data communication system (hereinafter "system") 100. The system 100 can include a plurality of sensors 110, 112, 114, at least one sensor data broker 120, a plurality of virtual sensors 130, 132, 134, one or more virtual sensor data brokers 140, 144, and one or more applications 150, 152, 154. The sensor data broker 120, virtual sensors 130-134 and virtual sensor data brokers 140, 144 can be implemented using program code and hosted using one or more processing systems, each including at least one processor and memory. For example, each of the sensor data broker 120, virtual sensors 130-134 and virtual sensor data brokers 140, 144 can be hosted on one processing system, or these different components can be hosted on different processing systems. The applications 150, 152, 154 also can be implemented using program code and hosted using one or more processing systems, each including at least one processor and memory.

The sensor data broker 120 can be configured to subscribe to sensor data 160, 162, 164 generated by the plurality of sensors 110-114. For example, the sensor data broker 120 can subscribe to the sensor data 160-164 by subscribing to a sensor data service hosted by one or more processing systems that receive the sensor data 160-164 and publish the sensor data 160-162. In this regard, one or more sensor data service agreements can be established between a first entity who controls/manages the sensor data broker 120 and one or more entities who control/manage the sensors 110-114. The sensor data 160-134 can include sensor data generated by one or more physical sensors and/or sensor data generated by one or more software sensors.

The subscription(s) can be defined by a sensor data service agreement indicating subscription parameters, such as sensor data 160-164 generated by one or more sensors 110-114 to which the sensor data broker 120 subscribes, the frequency at which the sensor data 160-164 is communicated to the sensor data broker 120, the applicable fees for subscribing to the sensor data 160-164, etc. Further, the subscription parameters can indicate the manner in which the first entity is charged for access to the sensor data 160-164, for example on a per use basis, or based on an amount of time the sensor data broker 120 subscribes to the sensor data 160-164 (e.g., seconds, minutes, hours, days, weeks, months, years, etc.), and the frequency at which the sensor data 160-164 is communicated to the sensor data broker 120. The charges also can be based on the quality or type of the sensor data used. Still, a sensor data service agreement can be structured in any suitable manner, and the present arrangements are not limited in this regard. In one arrangement, one or more processing systems communicatively linked to the sensors 110-114 can monitor communication of the sensor data 160-164 to the sensor data broker 120 based on the subscription and generate corresponding data to be used for billing purposes. It should be noted that other sensor data brokers also can subscribe to the sensor data 160-162 generated by the sensors 110-114 in a similar manner.

The sensor data broker 120 can receive the sensor data 160 and re-publish at least a portion of that sensor data as published sensor data 170. The sensor data broker 120 also can receive the sensor data 162 and re-publish at least a portion of that sensor data as published sensor data 172. Further, the sensor data broker 120 can receive the sensor data 164 and re-publish at least a portion of that sensor data as published sensor data (not shown in FIG. 1, but shown in FIG. 2 as published sensor data 274).

In one arrangement, the published sensor data 170 can include each type of data (e.g., data X, data Y and data Z) as the sensor data 160. In another arrangement, the published sensor data 170 can include a subset of the sensor data, for example data X and data Y, but not data Z. Similarly, the published sensor data 172 can include all or a portion of the sensor data 162, and the published sensor data 274 can include all or a portion of the sensor data 164. In one non-limiting arrangement, the published sensor data 170, 172, 274 can include samples of the sensor data 160-164, respectively. For example, the sensor data 160 can include data measured at a particular frequency (e.g., at every 500 millisecond interval), but the sensor data broker can publish a portion of these measurements, for example every fifth measurement, every tenth measurement, etc.

Figure 2:
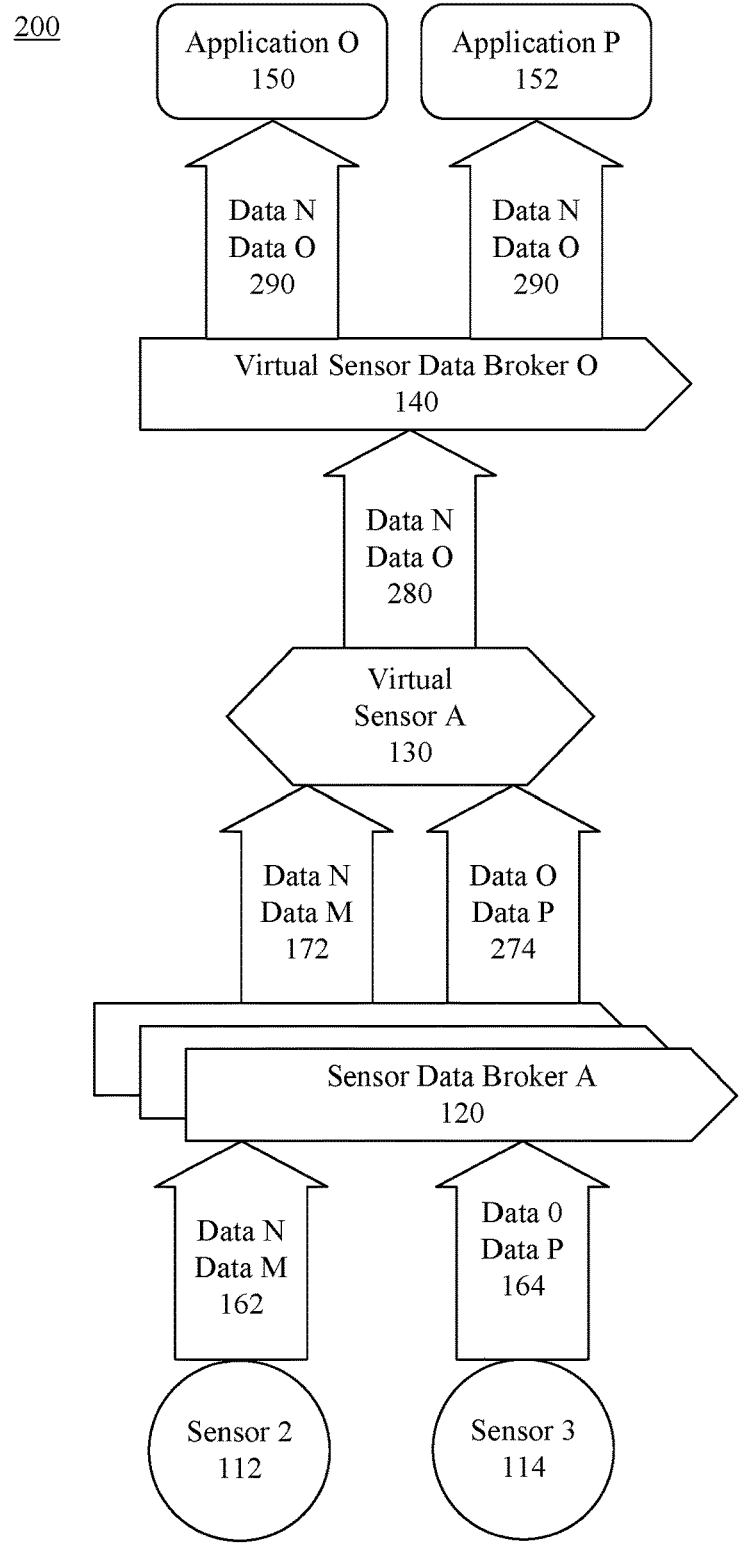

The virtual sensors 130-134 can subscribe to the published sensor data 170-172, and the sensor data broker 120 can communicate the published sensor data 170-172 to the virtual sensors 130-134 in accordance with the subscriptions. One or more of the virtual sensors 130-134 also can subscribe to the published sensor data 274 (as shown in FIG. 2, for example). The subscriptions can be defined in one or more sensor data service agreements established between one or more entities who manage and/or control the virtual sensors 130-134 and the entity who manages and/or controls the sensor data broker 120. The subscriptions can specify the data included in the published sensor data 170, 172, 274 (e.g., data from a particular sensor 110-114), the frequency at which the published sensor data 170, 172, 274 is communicated to the virtual sensors 130-134 (e.g., at intervals defined in seconds, minutes, hours, days, weeks, months, etc.), and the fee arrangements to pay for the usage of the published sensor data 170, 172, 274. The sensor data broker 120 can monitor usage of the published sensor data 170, 172, 274 by the virtual sensors 130-134, and generate corresponding data to be used for billing purposes. For example, a sensor data service agreement can establish that the entity managing controlling the virtual sensor 130 is charged each time the virtual sensor 130 receives published sensor data 170 from the sensor data broker 120, or charged based on an amount of time the virtual sensor 130 subscribes to the published sensor data 170 and the frequency at which the published sensor data 170 is communicated to the virtual sensor. The charges also can be based on the quality or type of the sensor data used. Similar sensor data service agreements can established between entities who manage and/or control the virtual sensors 132, 134 and the entity who manages and/or controls the sensor data broker 120. It should be noted that each virtual sensor 130-134 also can subscribe to sensor data published by one or more other sensor data brokers.

Each virtual sensor 130-134 can re-publish the received sensor data 170-172 received by that virtual sensor 130-134 as published sensor data (e.g., virtual sensor data) 180, 182, 184, respectively. In this example, the virtual sensor 130 can re-publish the published sensor data 170, and the virtual sensors 132, 134 each can re-publish the published sensor data 172. In one arrangement, when re-publishing the sensor data, the virtual sensors 130-134 can process and/or manipulate the sensor data, for example to convert the sensor data from one format to another, combine sensor data, normalize sensor data, interpolate sensor data, etc. In illustration, a virtual sensor 130 can received sensor data published by a plurality of sensor data brokers, and process and/or manipulate such sensor data together and publish that sensor data as the published sensor data 180-184.

Each virtual sensor data broker 140, 144 can subscribe to one or more groups of published sensor data 180-184 published by one or more virtual sensors 130-134, and the virtual sensors 130-134 can communicate the published sensor data 180-184 to the virtual sensor data brokers 140, 144 in accordance with the respective subscriptions. The subscriptions can be defined by one or more sensor data service agreements established between the entities controlling and/or managing the virtual sensor data brokers 140, 144 and the entities managing the virtual sensors 130-134, similar to those sensor data service agreements previously described. Accordingly, the entities controlling and/or managing the virtual sensor data brokers 140, 144 can be charged each time the virtual sensor data brokers 140, 144 receive published sensor data 180-184 from the virtual sensors 130-134, or charged based on an amount of time the virtual sensor data brokers 140, 144 subscribe to the published sensor data 180-184 and the frequency at which the published sensor data 180-184 is communicated to the virtual sensor data brokers 140, 144. The charges also can be based on the quality or type of the sensor data used.

The virtual sensor data brokers 140, 144 can re-publish the sensor data 180-184 as published sensor data 190, 192, 194 for consumption by the applications 150-154. In this regard, the applications 150-154 can subscribe to the published sensor data 190-194, and the virtual sensor data brokers 140, 144 can communicate the published sensor data 190-194 in accordance with corresponding subscriptions. For example, sensor data service agreements can be established between entities who control/manage the applications 150-154 and entities who control/manage the virtual sensor data brokers 140, 144. The frequency at which the applications 150-154 receive the published sensor data 190-194 and the fees for receiving the published sensor data 190-194 can be defined by the sensor data service agreements, for example in a manner similar to that previously described.

In one arrangement, the system can include an error detector 138 communicatively linked to each of the virtual sensors 130-134. In aspect, the error detector 138 can be another virtual sensor (not shown), though this need not be the case. The error detector 138 can implement error detection, for example prescriptive analytic modelling, on the published sensor data 170, 172. Responsive to identifying one or more anomalies in the published sensor data 170, 172, the error detector 138 can communicate an alert the virtual sensors 130-134 subscribing to the published sensor data 170, 172 in which the anomalies are present. The alert can indicate the anomalies in the published sensor data 170, 172.

To identify anomalies, the error detector 138 can compare and contrast sensor data deriving from different sensors that detect similar data and/or identify sensor data having values outside of a predetermined range. For example, assume that the sensors 110 and 112 each provide sensor data relating to ambient temperature and the sensors 110, 112 are located within one mile of each other. Also assume that the lowest ambient temperature recorded on a particular day of the year in the last fifty years is 66° F. and the highest ambient temperature recorded is 92° F. If the sensor 110 provides sensor data indicating an ambient temperature of 78° F. and the sensor 112 provides sensor data indicating an ambient temperature of −34° F., the error detector 138 can indicate to the virtual sensors 130-134 subscribing to the published sensor data 172 that there is an anomaly in the published sensor data 172.

Responsive to receiving the indication from the error detector 138 of the sensor data 172 anomaly, the affected virtual sensors 130-134 can process published sensor data derived from one or more other sensors, for example the sensor 110, to derive sensor data to be published. In illustration, the virtual sensors 130-134 can perform data interpolation and/or normalization to derive the sensor data to be published. If the other sensors already subscribe to such other sensor data, they can process that sensor data. Further, the virtual sensors 130-134 can be configured to dynamically subscribe to published sensor data derived from other sensors. Further, based on projected errors in the sensor data, the virtual sensors 130-134 can correct the sensor data. Accordingly, the applications 150-154 need not be tasked with performing first failure data capture (FFDC) or source data error detection.

The structure described herein can provide isolation of sensor data between the applications 150-154 and the virtual sensors 130-134, the sensor data broker(s) 120 and the sensors 110-114. In illustration, the sensor data broker 120 can receive sensor data 160-164 generated by each of the sensors 110-114, but the virtual sensors 130-134 need not receive all of such sensor data 160-164. For example, in one arrangement, the sensor data broker 120 can publish sensor data every certain number of sensor data readings, every certain number of seconds, minutes, hours, etc. in accordance with corresponding subscriptions. By subscribing to sensor data in this manner, the entities managing/controlling the virtual sensors 130-134 and the virtual sensor data brokers 140, 144 can reduce the fees charged for accessing the published sensor data 182-194 in circumstances in which fees are charged on a per use basis or based on a frequency of sensor data use.

Further, the isolation provided by the present arrangements can enhance security and privacy. In illustration, the entities that manage/control the sensors 110-114 need not be aware of the applications 150-154 using the sensor data. Moreover, the entities that manage/control the sensor data broker 120 and the virtual sensors 130-134 also need not be aware of the applications 150-154 using the sensor data. Thus, if unscrupulous people or systems are able to somehow access the processing systems hosting the sensor data broker 120 and the virtual sensors 130-134, information about the applications 150-154 using the sensor data will not be available, thus enhancing the level of security and privacy provided for the applications 150-154. Moreover, the applications 150-154 need not be provided direct access to the sensor data broker 120 or the virtual sensors 130-134, thus mitigating risk of entities who control/manage the applications 150-154 circumventing sensor data agreements established with the virtual sensor data brokers 140, 144.

In one aspect of the present arrangements, the various components 110-154 can send, receive, publish and subscribe to respective sensor data 160-194 using the MQTT protocol (formerly MQ Telemetry Transport protocol). MQTT is a machine-to-machine/Internet of Things connectivity protocol. MQTT provides extremely lightweight messaging transport using publish/subscribe implementations. MQTT is useful for connections with remote locations where a small code footprint is desired and/or it is desired to optimize use of network bandwidth. In one arrangement, the structure described herein can be implemented using IBM® Bluemix™ which is a cloud platform as a service (PaaS) supporting several programming languages and services.

FIG. 2 is a block diagram illustrating another example of a sensor data communication system (hereinafter "system") 200. In this example, operations are described in which data from a plurality of sensors are combined by a virtual sensor. The system 200 can include the plurality of sensors 112, 114, the sensor data broker 120 the virtual sensor 130, the virtual sensor data broker 140 and the plurality of applications 150, 152, which were previously described. In this example, the sensor data broker 120 can be configured to receive sensor data 162, 164 from the plurality of sensors 112, 114, respectively, and publish the received sensor data 162, 164 as published sensor data 172, 274.

The virtual sensor 130 can subscribe to the sensor data 172, 274 derived from sensor data 162, 164 generated by the sensors 112, 114, as previously described. In this example, the virtual sensor 130 can be configured to parse different groups or types of sensor data contained in the sensor data 162, for example into sensor data group N and sensor data group M. The virtual sensor 130 also can be configured to parse different groups or types of sensor data contained in the sensor data 164, for example into sensor data group O and sensor data group P. Further, the virtual sensor 130 can be configured to merge sensor data from the different published sensor data 172, 274. For example, the virtual sensor 130 can merge sensor data group N with the sensor data group O, and publish the merged sensor data as published sensor data (e.g., virtual sensor data) 280. Thus, the published sensor data 280 can appear to the virtual sensor data broker 140 to be sensor data generated by, or derived from, a single sensor, even though it can be derived from sensor data 162, 164 generated by a plurality of sensors 112, 114.

In one arrangement, the virtual sensor 130 can normalize and/or interpolate groups of sensor data to publish the sensor data 280. For example, the virtual sensor 130 can normalize and/or interpolate sensor data group N with the sensor data group O. By way of illustration, the sensor data group N can include sensor data pertaining to a coefficient of friction on a first portion of a road (e.g., due to rain, sleet, snow, etc.), and the sensor data group O can include sensor data pertaining to a coefficient of friction on a second particular portion of the road. The virtual sensor 130 can normalize and/or interpolate the sensor data groups N, 0 to estimate a coefficient of friction on a third portion of a road located between the first and second portions.

The virtual sensor data broker 140 can subscribe to the published sensor data 280, and re-publish that sensor data 280 as published sensor data 290. The applications 150, 152 can subscribe to the published sensor data 290. Notably, the published sensor data 290 can appear to the applications 150, 152 to be sensor data generated by, or derived from, a single sensor, even though that not might be the case.

The entity managing/controlling the virtual sensor 130 can charge the entity managing/controlling the virtual sensor data broker 140 for the merged sensor data 280. Continuing with the previous example pertaining to road conditions, the applications 150, 152 can be mobile applications installed on a user's mobile device (e.g., a smart phone or tablet computer) or applications installed on a processing system in a user's vehicle. The applications 150, 152 can process the published sensor data 290 to alert users of potentially hazardous road conditions. In this example, the sensors 112, 114 can be sensors installed on other vehicles that communicate the sensor data 162, 164 to the sensor data broker 120. Owners of such vehicles can be provided compensation for sharing their sensor data. For instance, such owners can share their sensor data 162, 164 in exchange for receiving published sensor data 290 generated based, at least in part, on sensor data shared by other vehicles.

The system 200 also can support the use of ad hoc sensor data. For example, one or more of the sensors 112, 114 can be mobile devices (e.g., smart phones, tablet computers, automotive systems, or the like), and users of the mobile devices can elect to publish their sensor data 162, 164. The sensor data broker 120 can include that sensor data 162, 164 in the published sensor data 172, 274. The virtual sensors can filter the published sensor data 172, 274 to select from among the published sensor data 172, 174 the sensor data to be included in the published sensor data 280.

In illustration, each of the sensor data 162, 164 can include location data generated by a respective mobile device, for example a global positional system (GPS) receiver. Each of the sensor data 162, 164 also can include ambient environment information, such as temperature, humidity, or the like. Assume a particular business entity desires to monitor the temperature and humidity in different areas of their establishment. The virtual sensor 130 can be configured to do so. For example, the virtual sensor 130 can process the location data contained in the published sensor data 172, 174 to filter the published sensor data 172, 174 and include in the published sensor data 280 only published sensor data 172, 174 derived from mobile devices presently located within the establishment. In such case, the published sensor data 280 can include, for each mobile device located in the establishment, the location of the mobile device, and the temperature and humidity detected by the mobile device at that location.

Figure 3:
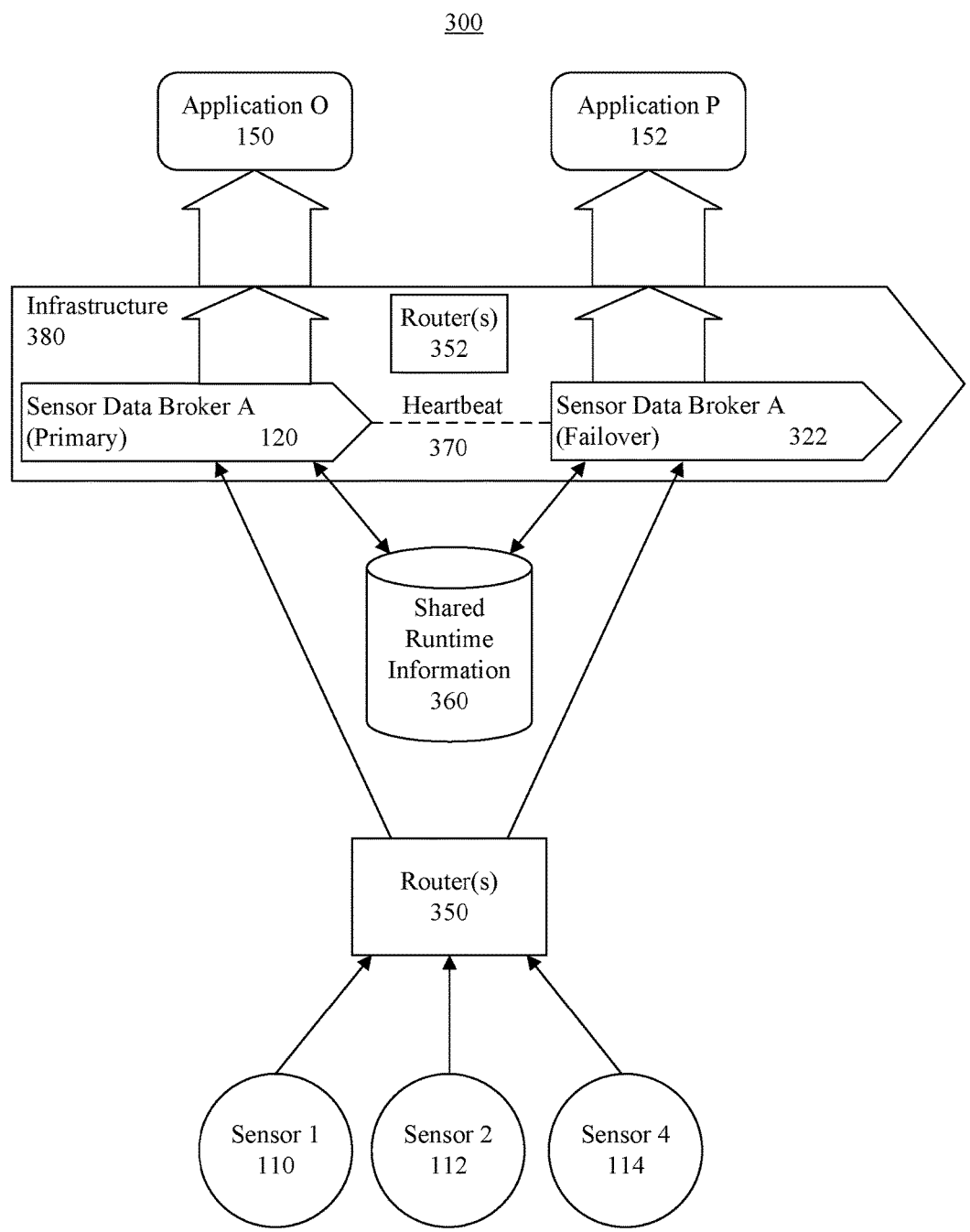

FIG. 3 is a block diagram illustrating another example of a sensor data communication system (hereinafter "system") 300. In this example, sensor data broker failover operations are described. The system 300 can include the plurality of sensors 110-114 and the plurality of applications 150, 152. In addition to the sensor data broker 120, the system 300 also can include a sensor data broker 322, which can operate as a failover sensor data broker if the sensor data broker 120, which can be a primary sensor data broker, should happen to encounter a fault or failure, or one or more communication links to the primary sensor data broker 120 are lost. The system 300 also can include one or more routers 350, one or more routers 352 and shared runtime information 360. The routers 350, 352 can be conventional domain name system (DNS)/internet protocol (IP) based routers, which are known in the art. The system 300 further can include the virtual sensors and virtual sensor data brokers previously described, which are represented generally in FIG. 3 as infrastructure 380.

In operation, sensor data generated by the sensors 110-114 can be communicated, via the router(s) 350, to both the sensor data broker 120 and the sensor data broker 322. Further, each of the sensor data brokers 120, 322 each can store shared runtime information 360 to be shared among the sensor data brokers 120, 322 to a computer-readable storage medium that is communicatively linked to each of the sensor data brokers 120, 322, for example via a suitable communication network. The shared runtime information 360 can indicate various infrastructure 380 components (e.g., virtual sensors) receiving published sensor data from the sensor data broker 120 and/or the sensor data broker 322, various information related sensor data utilization by the infrastructure 380 components, subscription topics, authentication information, etc.

The sensor data broker 120 can periodically communicate a signal (e.g., a heartbeat message 370) to the sensor data broker 322, for example every second, five seconds, ten seconds, thirty seconds, or the like. The heartbeat message 370 can indicate that the sensor data broker 120 is operating normally, for example as previously described. Responsive to the sensor data broker 322 not detecting the heartbeat message 370, or the heartbeat message 370 indicating that a fault or error has occurred in the sensor data broker 120, the sensor data broker 322 can, in real time, assume the role of brokering sensor data previously performed by the sensor data broker 120. When assuming such role, the sensor data broker 322 can access the shared runtime information 360 and begin publishing sensor data received from the sensors 110-114 on behalf of the sensor data broker 120. Further, the sensor data broker 322 can communicate with the router(s) 352 to update their DNS records to re-direct communications to/from the virtual sensors to/from the sensor data broker 322. The sensor data broker 322 also can monitor access to the published sensor data by the infrastructure 380 components and store corresponding information to the shared runtime information 360. Accordingly, the sensor data broker 322 can seamlessly take over publishing sensor data on behalf of the sensor data broker 322, thus providing a high level of availability of the sensor information. From the perspective of the virtual sensors, the virtual sensors can have continued access to the published sensor data, and the virtual sensors need not even be made aware that an issue with the sensor data broker 120 has occurred.

Responsive to the sensor data broker 120 recovering from the error, the sensor data broker 120 can, in real time, begin communicating to the sensor data broker 322 heartbeat messages 370 indicating that the sensor data broker 120 is ready to assume its role in publishing sensor data. The sensor data broker 120 also can communicate with the router(s) 352 to update their DNS records to re-direct communications to/from the virtual sensors to/from the sensor data broker 120 and access the shared runtime information 360 to resume its sensor data publishing role. Responsive to the heartbeat message 370 indicating that the sensor data broker 120 has resumed that role, the sensor data broker 322 can enter a standby state and continue monitoring the heartbeat messages 370 for one or more further fault conditions.

Failover of virtual sensor data brokers can be implemented in a manner similar to that described above. In such an arrangement, the DNS record changes to the router(s) 352 can be implemented to identify a failover virtual sensor data broker to both virtual sensors and the applications 150, 152 in place of a primary virtual sensor data broker. Thus, the failover virtual sensor data broker can access published sensor data from the virtual sensors in place of the primary virtual sensor data broker, and the applications 150, 152 can access published sensor data from the failover virtual sensor data broker in place of the primary virtual sensor data broker. Nonetheless, from the perspective of the virtual sensors and the applications 150, 152, the virtual sensors continue publishing the sensor data and the applications 150, 152 can continue accessing the published sensor data, without need to be made aware that an issue with the primary virtual sensor data broker has occurred. When the primary virtual sensor data has recovered from the error, it can again assume the role of receiving sensor data from the virtual sensors and publishing the sensor data to the applications 150, 152.

FIG. 4 is a block diagram illustrating another example of a sensor data communication system (hereinafter "system") 400. In this example, one arrangement of sensor failover operations are described. The system 400 can include a plurality of sensors 110, 410, the sensor data broker 120, the virtual sensor 130, as well as any number of other components, such as those described in FIG. 1.

The sensor 410 can be configured to detect values or changes in physical quantities that are the same as, or similar to, values or changes in physical quantities detected by the sensor 110, and generate corresponding sensor data 460. The sensor data broker 120 can be configured to receive the sensor data 160 and the sensor data 460. For example, by virtue of subscribing to the sensor data 160, a processing system managing and/or controlling the sensors 110, 410 can automatically subscribe the sensor data broker 120 to the sensor data 460.

In operation, the sensor 110 can communicate to the sensor data broker 120 the sensor data 160, which can publish the sensor data 160 as published sensor data 170. Further, the sensor 110 can periodically communicate a signal (e.g., a heartbeat message 470) to the sensor 410, for example every second, five seconds, ten seconds, thirty seconds, or the like. The heartbeat message 470 can indicate that the sensor 110 is operating normally, for example as previously described. Responsive to the sensor 410 not detecting the heartbeat message 470, or the heartbeat message 470 indicating that an error has occurred in the sensor 110, the sensor 410 can determine a fault condition for the sensor 110. Responsive to detecting the fault condition, the sensor 410 can, in real time, begin communicating to the sensor data broker 120 sensor data 460.

The sensor data 460 can be formatted in the same manner as the sensor data 160. Thus, the sensor data broker 120 need not be aware that the sensor data 460 is generated by a different sensor than the sensor data 160. Indeed, the sensor data 460 can represent values or changes in physical quantities that are the same as, or similar to, those represented by the sensor data 160. The sensor data broker 120 can receive the sensor data 460 and publish the sensor data 460 as the published sensor data 170. Nonetheless, the sensor data broker 120 can continue publishing the published sensor data 170 without interruption.

Responsive to the sensor 110 recovering from the error, the sensor 110 can, in real time, begin communicating to the sensor 410 heartbeat messages 470 indicating that the sensor 110 has recovered from the error, and the sensor 410 can again communicate to the sensor data broker 120 the sensor data 160. Responsive to receiving a heartbeat message 470 indicating the sensor has recovered from the error, the sensor 410 can stop communicating the sensor data 460.

In another arrangement, both the sensors 110, 410 can be configured to communicate the sensor data 160, 460, respectively, to the sensor data broker 120 during normal operation, and the sensor data broker 120 can subscribe to each of the sensor data 160, 460. The sensor data broker 120 can normally publish the sensor data 160 as the published sensor data 170. Responsive to the sensor data broker 120 failing to receive the sensor data 160 in a normal manner, for example due to the sensor 110 stopping communication of the sensor data 160 or a communication link between the sensor 110 and the sensor data broker 120 being lost, the sensor data broker 120 can automatically, in real time, begin publishing the sensor data 460 as the published sensor data 170. In such an arrangement, the heartbeat message 470 between the sensors 110, 410 would not be needed.

FIG. 5 is a block diagram illustrating another example of a sensor data communication system (hereinafter "system") 500. In this example, another arrangement of sensor failover operations are described. The system 500 can include a plurality of sensors 110, 510, the sensor data broker 120, the virtual sensor 130, as well as any number of other components, such as those described in FIG. 1. The sensor 510 can be configured to detect values or changes in physical quantities that are the same as, or similar to, values or changes in physical quantities detected by the sensor 110, and generate corresponding sensor data 560.

The sensor data broker 120 can be configured to receive the sensor data 160 from the sensor 110 and publish that sensor data as the published sensor data 170. In one arrangement, the sensor data broker 120 also can be configured to receive the sensor data 560 from the sensor 510 and publish that sensor data as the published sensor data 570. In another arrangement, a different sensor data broker can be configured to receive the sensor data 560 from the sensor 510 and publish that sensor data as the published sensor data 570.

The virtual sensor 130 can subscribe to the published sensor data 170 and the published sensor data 570. The virtual sensor 130 can receive the published sensor data 170 and re-publish the sensor data 170 as published sensor data 180. As noted, when re-publishing the sensor data 170, the virtual sensor 130 can process and/or manipulate the sensor data, for example to convert the sensor data from one format to another, combine sensor data, normalize sensor data, interpolate sensor data, etc.

Responsive to the virtual sensor 130 failing to receive the published sensor data 170 in a normal manner, the virtual sensor 130 can automatically begin publishing the sensor data 570 as the published sensor data 180. The virtual sensor 130 can fail to receive the published sensor data 170, for example, due to communication of the sensor data 160 to the sensor data broker 120 being lost or, in the case the virtual sensor 130 receives the published sensor data 570 from another sensor data broker, responsive to a communication link between the virtual sensor 130 and the sensor data broker 120 being lost.

Again, when re-publishing the sensor data 570, the virtual sensor 130 can process and/or manipulate the published sensor data 570, for example to convert the sensor data from one format to another, combine sensor data, normalize sensor data, interpolate sensor data, etc. In an arrangement in which the sensor 510 generates sensor data 560 that, although being similar to the sensor data 160, is not precisely the same as the sensor data 160, such processing and/or manipulation of the published sensor data 570 can include approximating the published sensor data 170 by normalizing and/or interpolating the published sensor data 570 so that the published sensor data 180 generated based on the published sensor data 570 is a close approximation to the published sensor data 180 generated based on the published sensor data 170. For example, if the sensor 110 measures a particular physical quantity, and the sensor 510 measures the same physical quantity, but is performing its measurement from a different location, and the sensor 510 generally produces sensor data 560 that is ten percent lower in value than the sensor data 160, the virtual sensor can scale the sensor data 560 up by a compensating factor. In illustration, if a particular data parameter indicates a value of nine, that value can be scaled up to have a value of ten. In another arrangement, if the sensor 110 is located between the sensor 510 and another sensor, the published sensor data 570 and sensor data generated by the other sensor can be interpolated so that the published sensor data 180 is a close approximation to the published sensor data 180 generated based on the sensor data 170.

Figure 6:
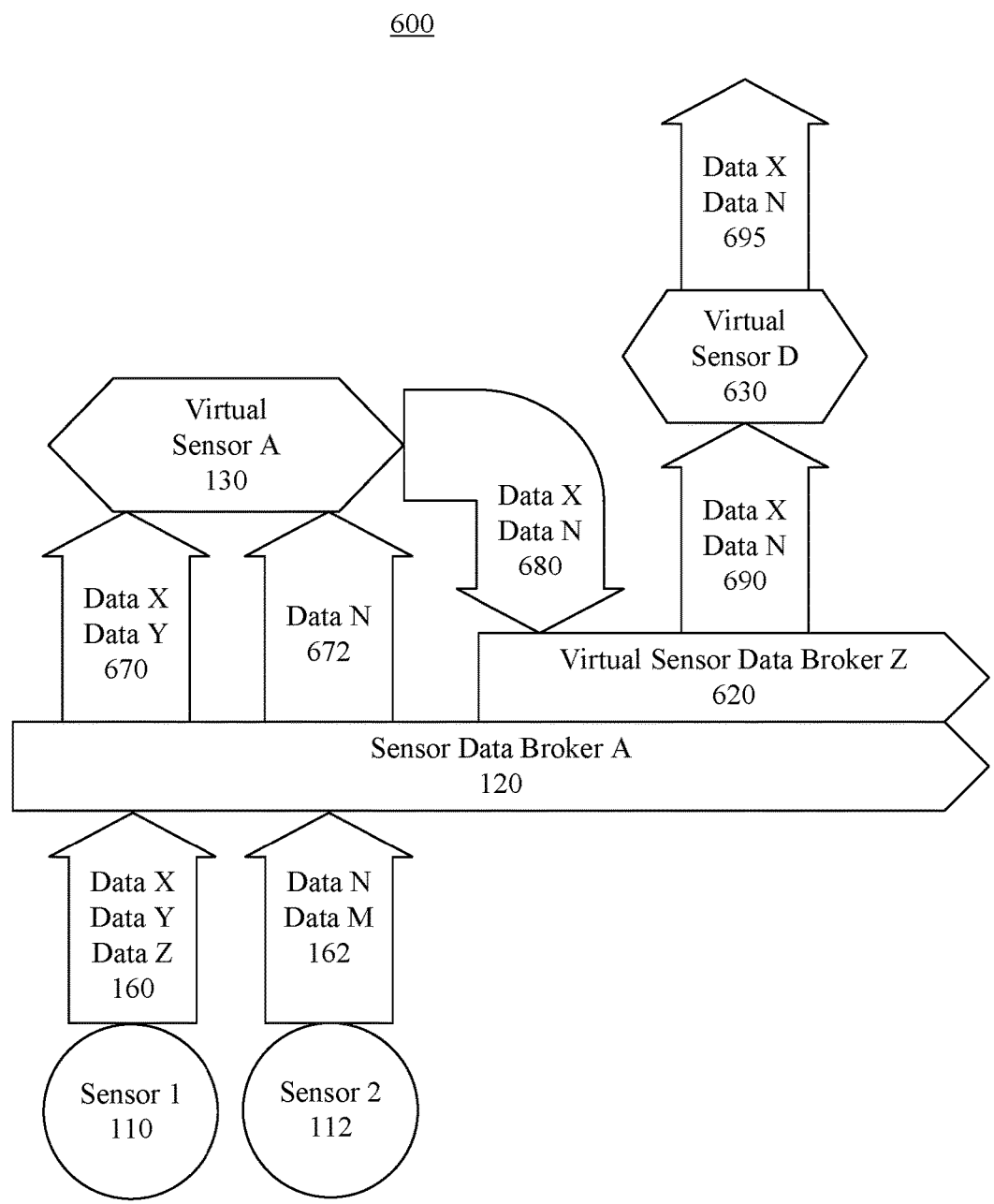

FIG. 6 is a block diagram illustrating another example of a sensor data communication system (hereinafter "system") 600. In this example, virtual sensor daisy chain operations are described. The system 600 can include a plurality of sensors 110, 112, the sensor data broker 120, the virtual sensor 130, as well as any number of other components, such as those described in FIG. 1. The system 600 also can include a virtual sensor data broker 620 and a virtual sensor 630.

In this example, the sensor data broker 120 can receive sensor data 160, 162 generated by the sensors 110, 112 and publish the sensor data as published sensor data 670, 672. Optionally, the sensor data broker 120 can parse one or more data groups from the sensor data 160, 162 to include in the published sensor data 670, 672, though the present arrangements are not limited in this regard. The virtual sensor 130 can subscribe to the published sensor data 670, 672 and, responsive to receiving the published sensor data 670, 672, publish sensor data (e.g., virtual sensor data) 680 derived from the published sensor data 670, 672. The published sensor data 680 can include one or more sensor data groups contained in the published sensor data 670, 672, for example data group X and data group N. A virtual sensor data broker 620 can subscribe to the published sensor data 680, for example as previously described, and re-publish that sensor data as published sensor data (e.g., virtual sensor data) 690. In addition to, or in lieu of, one or more applications subscribing to the published sensor data 690, the virtual sensor 630 can subscribe to the published sensor data 690 and re-publish that sensor data as published sensor data (e.g., virtual sensor data) 695. One or more applications (not shown), can subscribe to the published sensor data 695.

In illustration, assume that a first entity has developed the virtual sensor 130. Also assume that a second entity that provides published sensor data from their own virtual sensors needs to publish the same sensor data 680 published by the virtual sensor 130. Rather than having to develop the same virtual sensor that the first entity has already developed, the second entity can configure their virtual sensor 630 to subscribe to the published sensor data 690, which corresponds to the published sensor data 680 published by the virtual sensor 130. This can benefit both entities; the first entity can receive a subscription fee from the second entity, and the second entity need not invest in certain development costs.

By way of a specific example, the virtual sensor 130 can be owned by company X and the virtual sensor 630 can be owned by company Y. The sensor data 680 can represent road traction conditions, and can include sensor data generated by sensors from a set of vehicles O traveling on a particular road. The virtual sensor 630 can provide the sensor data 695 to other vehicles P travelling behind the vehicles O on that same road. In this scenario, the virtual sensor 630 can select the sensor data 690 based on the present locations of the vehicles P, for instance as indicated by corresponding GPS data, and the locations of vehicles O that generated the sensor data 160, 162. In this regard, the sensor data 680 can include corresponding location data. Further, the virtual sensor 630 can be configured to subscribe to sensor data 690 pertaining to a particular make and model of a vehicle O. The virtual sensor 630 can normalize the sensor data 690 for vehicles P that are particular make and model.

In this example, the virtual sensor 130 can aggregate sensor data across multiple virtual sensors that publish sensor data pertaining to different vehicle makes and models, but the virtual sensor 630 can subscribe to sensor data 690 generated by vehicles that are of a certain make and model. Another virtual sensor (not shown), for example a virtual sensor within a particular vehicle P), can process the sensor data received from the virtual sensor 630 to determine traction conditions of the road. Further, the virtual sensor can normalize the sensor data 695, along with sensor data generated by that vehicle pertaining to tire wear, traction data, speed, and the like, to determine an impact the road conditions will have on that particular vehicle P. Based on such determination, the vehicle P can present an alert to a driver of the vehicle indicating the road conditions and the impact of the conditions on the vehicle, and may suggest to the driver to slow down.

In another arrangement, the virtual the virtual sensor 630 or another virtual sensor (not shown) can aggregate sensor data received from multiple virtual sensors that publish sensor data pertaining to different vehicle makes and models, and transform the virtual sensors data so that it can be used by a different vehicle make and model. For example, the transformation can be performed by a virtual sensor that understands received sensor data pertaining to the specific make and model.

FIG. 7 is a flow chart illustrating an example of a method 700 of brokering sensor data. At step 705, a sensor data broker executed by a processor can receive first sensor data generated by a first of a plurality of sensors and at least second sensor data generated by at least a second of the plurality of sensors. At step 710, the sensor data broker can publish to at least a first virtual sensor the first sensor data. The first sensor data can be published as first published sensor data. At step 715, the sensor data broker can publish to at least a second virtual sensor the second sensor data. The second sensor data can be published as second published sensor data.

FIGS. 8*a* and 8B are a flow chart illustrating another example of a method 800 of brokering sensor data. At step 805, a utilization by at least one virtual sensor of sensor data can be monitored. The sensor data can be provided by at least one sensor (e.g., at least one physical sensor and/or software sensor). At step 810, a utilization by at least one application of virtual sensor data published by the at least one virtual sensor can be monitored. The virtual sensor data can be generated by the at least one virtual sensor based on the sensor data. For example, the at least one virtual sensor can process the sensor data to generate the virtual sensor data, for example as previously described. The utilization of the sensor data and virtual sensor data can be monitored using any of a variety of utilization measurements, for example frequency of sensor data and/or virtual sensor data usage, quantity of sensor data and/or virtual sensor data usage, quality of sensor data and/or virtual sensor data being utilized, and the like.

At step 815, at least a first sensor data use parameter can be generated by a processor. The first sensor data use parameter can indicate the utilization of the virtual sensor data by the at least one application. At step 820, at least a second sensor data use parameter can be generated. The second sensor data use parameter can indicate the utilization of the sensor data by the at least one virtual sensor.

At step 825, a fee to be charged for use of the virtual sensor data by the at least one application can be determined. The fee can be determined based on the first sensor data use parameter indicating the utilization of the virtual sensor data by the at least one application. At step 830, a fee to be charged for use of the sensor data by the at least one virtual sensor can be determined. The fee can be determined based on the second sensor data use parameter indicating the utilization of the sensor data by the at least one virtual sensor.

At step 835, a compensation to be provided to an entity managing or controlling the at least one virtual sensor can be determined. The compensation can be determined based on the first sensor data use parameter indicating the utilization of the virtual sensor data by the at least one application. At step 840, a compensation to be provided to an entity managing or controlling the at least one sensor can be determined. The compensation can be based on the first sensor data use parameter indicating the utilization of the virtual sensor data by the at least one application and/or the second sensor data use parameter indicating the utilization of the sensor data by the at least one virtual sensor. At step 845, a compensation to be provided to an entity managing or controlling a sensor data communication system can be determined. The compensation can be determined based on the first sensor data use parameter indicating the utilization of the virtual sensor data by the at least one application and/or the second sensor data use parameter indicating the utilization of the sensor data by the at least one virtual sensor. The data communication system can provide a sensor data management infrastructure for managing the sharing of sensor data and virtual sensor data.

Figure 9:
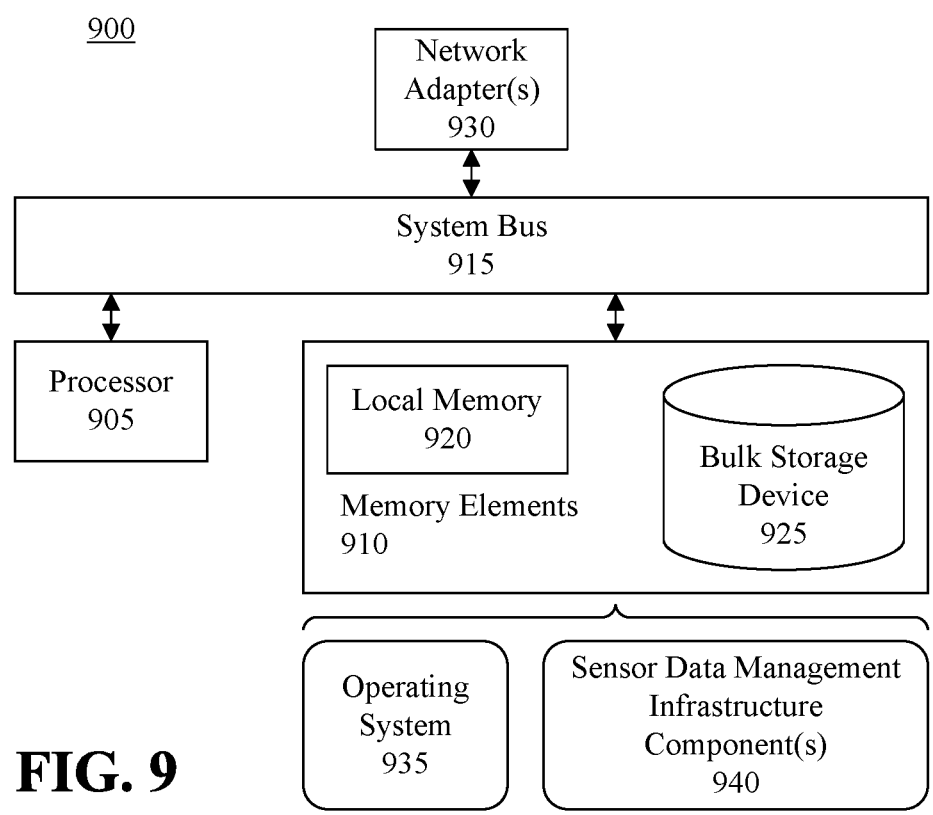
FIG. 9 is a block diagram illustrating example architecture for a data processing system.

FIG. 9 is a block diagram illustrating example architecture for a data processing system 900 which may be used to host one or more of the sensor data broker 120, the virtual sensors 130-134, or the virtual sensor data brokers 140, 144 of FIG. 1.

The data processing system 900 can include at least one processor 905 (e.g., a central processing unit) coupled to memory elements 910 through a system bus 915 or other suitable circuitry. As such, the data processing system 900 can store program code within the memory elements 910. The processor 905 can execute the program code accessed from the memory elements 910 via the system bus 915. It should be appreciated that the data processing system 900 can be implemented in the form of any system including a processor and memory that is capable of performing the functions and/or operations described within this specification. For example, the processing system 700 can be implemented as a server, a plurality of communicatively linked servers, or the like.

The memory elements 910 can include one or more physical memory devices such as, for example, local memory 920 and one or more bulk storage devices 925. Local memory 920 refers to random access memory (RAM) or other non-persistent memory device(s) generally used during actual execution of the program code. The bulk storage device(s) 925 can be implemented as a hard disk drive (HDD), solid state drive (SSD), or other persistent data storage device. The data processing system 900 also can include one or more cache memories (not shown) that provide temporary storage of at least some program code in order to reduce the number of times program code must be retrieved from the bulk storage device 925 during execution.

One or more network adapters 930 can be coupled to data processing system 900, for example via the system bus 915, to enable the data processing system 900 to become coupled to other systems, computer systems, and/or remote storage devices through intervening private or public networks. Modems, cable modems, transceivers, and Ethernet cards are examples of different types of network adapters 930 that can be used with the data processing system 900.

As pictured in FIG. 9, the memory elements 910 can store an operating system 935 and one or more sensor data management infrastructure components 940 (e.g., one or more of the sensor data broker 120, the virtual sensors 130-134, or the virtual sensor data brokers 140, 144 of FIG. 1). Being implemented in the form of executable program code, the component(s) 940 can be executed by the data processing system 900 and, as such, can be considered part of the data processing system 900. Moreover, the component(s) 940 are functional data structures that impart functionality when employed as part of the data processing system 900.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a sensor data broker, first sensor data provided by a first sensor and second sensor data provided by at least a second sensor;
generating, by the sensor data broker, published sensor data by aggregating the first sensor data and the second sensor data;
publishing, by the sensor data broker, the published sensor data to at least one virtual sensor; and
monitoring, by the sensor data broker, a utilization of the published sensor data by the at least one virtual sensor of sensor, wherein the at least one virtual sensor publishes to at least one application the published sensor data as virtual sensor data.

2. The method of claim 1, further comprising:
monitoring a utilization of the virtual sensor data by the at least one application; and
generating at least one sensor data use parameter indicating the utilization of the virtual sensor data by the at least one application.

3. The method of claim 2, further comprising:
determining a first compensation to be provided to a first entity managing or controlling the at least one virtual sensor based on the sensor data use parameter indicating the utilization of the virtual sensor data by the at least one application.

4. The method of claim 3, further comprising:
determining a second compensation to be provided to a second entity managing or controlling the at least one sensor based on the sensor data use parameter indicating the utilization of the virtual sensor data by the at least one application, wherein the second entity managing or controlling the at least one sensor is not the first entity managing or controlling the at least one virtual sensor.

5. The method of claim 3, further comprising:
determining a second compensation to be provided to a second entity managing or controlling a sensor data communication system based on the sensor data use parameter indicating the utilization of the virtual sensor data by the at least one application, wherein the second entity managing or controlling the sensor data communication system is not the first entity managing or controlling the at least one virtual sensor.

6. The method of claim 1, further comprising:
based on the monitoring, by the sensor data broker, the utilization of the published sensor data by the at least one virtual sensor of sensor, generating at least one sensor data use parameter indicating the utilization of the published sensor data by the at least one virtual sensor.

7. The method of claim 6, further comprising:
determining a first compensation to be provided to a first entity managing or controlling the at least one sensor based on the sensor data use parameter indicating the utilization of the published sensor data by the at least one virtual sensor.

8. The method of claim 7, further comprising:
determining a second compensation to be provided to a second entity managing or controlling a sensor data communication system based on the sensor data use parameter indicating the utilization of the published sensor data by the at least one virtual sensor, wherein the second entity managing or controlling the sensor data communication system is not the first entity managing or controlling the at least one sensor.

9. A system, comprising:
a processor programmed to initiate executable operations comprising:
receiving, by a sensor data broker, first sensor data provided by a first sensor and second sensor data provided by at least a second sensor;
generating, by the sensor data broker, published sensor data by aggregating the first sensor data and the second sensor data;
publishing, by the sensor data broker, the published sensor data to at least one virtual sensor; and
monitoring, by the sensor data broker, a utilization of the published sensor data by the at least one virtual sensor, wherein the at least one virtual sensor publishes to at least one application the published sensor data as virtual sensor data.

10. The system of claim 9, the executable operations further comprising:
monitoring a utilization of the virtual sensor data by the at least one application; and
generating at least one sensor data use parameter indicating the utilization of the virtual sensor data by the at least one application.

11. The system of claim 10, the executable operations further comprising:
determining a first compensation to be provided to a first entity managing or controlling the at least one virtual sensor based on the sensor data use parameter indicating the utilization of the virtual sensor data by the at least one application.

12. The system of claim 11, the executable operations further comprising:
determining a second compensation to be provided to a second entity managing or controlling the at least one sensor based on the sensor data use parameter indicating the utilization of the virtual sensor data by the at least one application, wherein the second entity managing or controlling the at least one sensor is not the first entity managing or controlling the at least one virtual sensor.

13. The system of claim 11, the executable operations further comprising:
determining a second compensation to be provided to a second entity managing or controlling a sensor data communication system based on the sensor data use parameter indicating the utilization of the virtual sensor data by the at least one application, wherein the second entity managing or controlling the sensor data communication system is not the first entity managing or controlling the at least one virtual sensor.

14. The system of claim 9, the executable operations further comprising:
based on the monitoring, by the sensor data broker, the utilization of the published sensor data by the at least one virtual sensor of sensor, generating at least one sensor data use parameter indicating the utilization of the published sensor data by the at least one virtual sensor.

15. The system of claim 14, the executable operations further comprising:
determining a first compensation to be provided to a first entity managing or controlling the at least one sensor based on the sensor data use parameter indicating the utilization of the published sensor data by the at least one virtual sensor.

16. The system of claim 15, the executable operations further comprising:
determining a second compensation to be provided to a second entity managing or controlling a sensor data communication system based on the sensor data use parameter indicating the utilization of the published sensor data by the at least one virtual sensor, wherein the second entity managing or controlling the sensor data communication system is not the first entity managing or controlling the at least one sensor.

17. A computer program product comprising a computer readable storage medium having program code stored thereon, the program code executable by a processor to perform a method comprising:
receiving, by a sensor data broker, first sensor data provided by a first sensor and second sensor data provided by at least a second sensor;
generating, by the sensor data broker, published sensor data by aggregating the first sensor data and the second sensor data;
publishing, by the sensor data broker, the published sensor data to at least one virtual sensor; and
monitoring, by the sensor data broker, a utilization of the published sensor data by the at least one virtual sensor of sensor, wherein the at least one virtual sensor publishes to at least one application the published sensor data as virtual sensor data.

18. The computer program product of claim 17, the method further comprising:
monitoring a utilization of the virtual sensor data by the at least one application; and
generating at least one sensor data use parameter indicating the utilization of the virtual sensor data by the at least one application.

19. The computer program product of claim 18, the method further comprising:
determining a first compensation to be provided to a first entity managing or controlling the at least one virtual sensor based on the sensor data use parameter indicating the utilization of the virtual sensor data by the at least one application; and
determining a second compensation to be provided to a second entity managing or controlling the at least one sensor or a third entity managing or controlling a sensor data communication system based on the sensor data use parameter indicating the utilization of the virtual sensor data by the at least one application.

20. The computer program product of claim 17, the method further comprising:
based on the monitoring, by the sensor data broker, the utilization of the published sensor data by the at least one virtual sensor of sensor, generating at least one sensor data use parameter indicating the utilization of the published sensor data by the at least one virtual sensor;
determining a first compensation to be provided to a first entity managing or controlling the at least one sensor based on the sensor data use parameter indicating the utilization of the published sensor data by the at least one virtual sensor; and
determining a second compensation to be provided to a second entity managing or controlling a sensor data communication system based on the sensor data use parameter indicating the utilization of the published sensor data by the at least one virtual sensor.

* * * * *